US006823266B2

(12) United States Patent
Czernuszenko et al.

(10) Patent No.: US 6,823,266 B2
(45) Date of Patent: Nov. 23, 2004

(54) METHOD FOR PERFORMING OBJECT-BASED CONNECTIVITY ANALYSIS IN 3-D SEISMIC DATA VOLUMES

(75) Inventors: Marek K. Czernuszenko, Sugar Land, TX (US); Steven R. May, Bellaire, TX (US); Yao C. Cheng, Bellaire, TX (US); Paul A. Dunn, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 10/195,582

(22) Filed: Jul. 15, 2002

(65) Prior Publication Data

US 2004/0153247 A1 Aug. 5, 2004

Related U.S. Application Data

(63) Continuation-in-part of application No. 10/166,538, filed on Jun. 10, 2002, now abandoned.
(60) Provisional application No. 60/299,527, filed on Jun. 20, 2001.

(51) Int. Cl.[7] .................................................. G01V 1/30
(52) U.S. Cl. .......................................... 702/14; 703/10
(58) Field of Search ............................... 702/14, 7, 16; 703/10; 367/72, 57

(56) References Cited

U.S. PATENT DOCUMENTS

| | | | |
|---|---|---|---|
| 4,751,643 A | 6/1988 | Lorensen et al. | 364/414 |
| 4,903,202 A | 2/1990 | Crawford | 364/413 |
| 5,432,751 A * | 7/1995 | Hildebrand | 367/72 |
| 5,586,082 A | 12/1996 | Anderson et al. | 367/73 |
| 5,671,136 A | 9/1997 | Willhoit, Jr. | 364/21 |
| 5,798,982 A | 8/1998 | He et al. | 367/73 |
| 5,835,883 A * | 11/1998 | Neff et al. | 702/7 |
| 5,966,672 A | 10/1999 | Knupp | 702/16 |
| 5,999,489 A | 12/1999 | Lazaratos | 367/57 |
| 6,092,026 A | 7/2000 | Bahorich et al. | 702/16 |
| 6,226,596 B1 | 5/2001 | Gao | 702/16 |

FOREIGN PATENT DOCUMENTS

| | | | | |
|---|---|---|---|---|
| WO | WO 2003003053 A1 * | 1/2003 | | G01V/1/28 |
| WO | WO 2004008381 A1 * | 1/2004 | | G06K/9/00 |

OTHER PUBLICATIONS

Altum, J., Chapel, G., and Cocker, M. (1995) "Old Wells New Tools; Troporo Field, A Case Study", AAPG Annual Conv., Houston, TX, Mar. 5–8, 1995.

Anderson, R., Boulanger, A. et al., (1995) "Method Described for Using 4D Seismic to Track Reservoir Fluid Movement", Oil & Gas Journal, Apr. 3, 1995, pp. 70–74.

Marotta, D., Alexander, C. et al., (1998) "The Use of 3D Visualization for Understanding Tertiary Deep–Water Clastic Systems: a West Africa Example", AAPG International Conf., Rio de Janeiro, Brazil, Nov. 8–11, 1998, pp. 746–747.

Meanley, E., et al. (1995) "3–D Applications of GeoTracker as a Link Between a Seismic Workstation and a Reservoir Model", 5th ARCHIE Conference, The Woodlands, TX, May 14–18, 1995, 2 pgs.

Roberts, D. (1999) "Voxel Technology Speeds Interpretation", Amer. Oil & Gas Rep., 07/99, pp. 102–108.

Roe, L., et al., (1995) "Three Dimensional Visualization of Geostatistical Models in the McElroy Field of West Texas Using VoxelGeo", 5th ARCHIE Conference, The Woodlands, TX, May 14–18, 1995, 3 pgs.

(List continued on next page.)

*Primary Examiner*—John E. Barlow
*Assistant Examiner*—Victor J Taylor
(74) *Attorney, Agent, or Firm*—J. Paul Plummer; Gary P. Katz (57) ABSTRACT

A method for predicting the connectivity of seismic objects identified by seed detection or similar methods.

6 Claims, 11 Drawing Sheets

OTHER PUBLICATIONS

Tinker, S., et al., (1995) "Three–Dimensional Reservoir Characterization: Worldwide Examples and Economics", Fifth ARCHIE Conference, The Woodlands, TX, May 14–18, 1995, 9 pgs.

Tinker, S. (1996) "Building the 3–D Jigsaw Puzzle: Applications of Sequence Stratigraphy to 3–D Reservoir Characterization, Permian Basin", AAPG Bulletin, vol. 80, No. 4, Apr. 1996, pp. 460–485.

Wonham, J., Jayr, S., Claude, D., and Insalaco, E. (1999) "3D Sedimentary Evolution of Turbidite Channel Reservoirs, Gulf of Guinea, West Africa", AAPG Bulletin, vol. 83, No. 8, 1999, pp. 1345–1346.

Roberts, D. (1998) "Voxel Technology", Offshore Technology Conference, May 4–7, 1998, pp. 167–168.

VoxelView/ULTRA 2.1 Release Notes, 1993, 20 pgs.

* cited by examiner

METHOD FOR PERFORMING OBJECT-BASED CONNECTIVITY ANALYSIS IN 3-D SEISMIC DATA VOLUMES

This application claims the benefit of U.S. Provisional Application No. 60/299,527 filed on Jun. 20, 2001, and is a continuation-in-part of U.S. application Ser. No. 10/166,538 filed on Jun. 10, 2002 now abandoned.

FIELD OF THE INVENTION

This invention relates generally to the field of seismic interpretation. Specifically, the invention is a method for performing a deterministic analysis of the likelihood of connectivity of seismic objects that satisfy certain attribute criteria.

BACKGROUND OF THE INVENTION

A common problem in 3D seismic interpretation is the extraction of geologic features from an attribute volume and evaluation of their geometric relationships to each other and implications for connectivity. Bulk processing of a seismic volume results in the detection of one or more seismic "objects" at a certain attribute threshold. An "object" is defined as a region in which the value of a certain selected seismic attribute (acoustic impedance, for example) satisfies some arbitrary threshold requirement, i.e. is either greater than some minimum value or is less than some maximum value. At a certain threshold, two such regions may not be connected (i.e., they are two objects); at a different threshold, they may be connected (i.e., a single object). The interpreter must decide which threshold depicts a scenario that is more consistent with other known information about the area. Selection of an appropriate threshold is not always straightforward and it may take multiple iterations to achieve the desired result. [The desired result of course, is that the seismic objects should correspond to actual underground reservoirs, and where two objects are interpreted as either connected or not, that would mean that the corresponding reservoirs if they contain oil or gas, would also be connected (or not), meaning that a well producing one reservoir can also drain the other (or cannot).] Interpretation time could be reduced significantly if one could bulk process a seismic volume, and generate a collection of seismic objects detected at various attribute thresholds as well as information about connectivity of these objects.

Identification of seismic objects using various seismic attributes as indicators is known in the seismic art, as partially summarized below. All such known methods are deficient in providing sufficient information about how the objects thus identified might be connected or further subdivide at different attribute and object size thresholds.

In the following paragraphs these terms will be used more or less interchangeably:
cell, voxel, point
geobody, seismic object, object The technique commonly known as seed picking results in a set of voxels in a 3D volume, which fulfil user-specified attribute criteria and are connected. The technique has been implemented in several commercial products such as VoxelGeo, GeoViz, Gocad, Jason and others. It is an interactive method, where the user specifies the initial "seed" point and attribute criteria. The algorithm marks the initial point as belonging to the current object, and tries to find this point's neighbors that satisfy the specified attribute criteria. The new points are added to the current object, and the procedure continues until it is not possible to find any new neighbors fulfilling the specified criteria.

Seed picking requires a criterion for connectedness. There are two criteria commonly used, although others may be defined and used. One definition is that two cells are connected (i.e., are neighbors) if they share a common face. By this definition of connectivity, a cell (or voxel) can have up to six neighbors. The other common criterion for being a neighbor is sharing either an edge, a face, or a corner. By this criterion, a cell can have up to twenty-six neighbors.

There are a number of examples in the literature, which describe detection of geobodies or seismic objects based on seed picking.

Seed picking may have originated in medical applications. For example, 1988 U.S. Pat. No. 4,751,643 to William Lorensen and Harvey Cline discloses a specific seed picking algorithm that enables radiologists and surgeons to display only bone tissue or only soft tissue and provides them with extensive preoperative information. The algorithm is claimed to be very fast because it accesses the original data values only once. The first step is labeling, which means checking the attribute criteria for each voxel. It marks cells fulfilling the criteria as 1, and the others as 0. Then the connectivity (region growing) algorithm is employed which works on this single-bit data set.

In the oil and gas industry, object identification by seed picking has become widespread although few papers describe specific seed picking algorithms, probably because the use of seed picking algorithms implemented in commercial software products like VoxelGeo are so available.

The method disclosed in U.S. Pat. No. 5,586,082 to Roger Anderson, et al. is an example of a seed growing method of detecting seismic objects with an interest in how these objects, distinct at one threshold of the chosen attribute, may be connected at another threshold. Anderson's method identifies high amplitude regions, suggestive of petroleum presence using seismic attribute analysis, with the object of determining oil or gas migration pathways connecting those regions, or alternatively to determine that certain regions are unconnected. Anderson's method depends on having and analyzing multiple 3-D seismic surveys of the same region acquired at different times, using the small changes to suggest the drainage pathways and connectivity.

What is needed to improve upon existing seed detection methods is a fast method of determining from a single seismic data set the connectivity between objects that may be connected at certain attribute thresholds but not at others, and a systematic way of keeping track of such connectivity as a function of attribute threshold. The present inventive method satisfies these needs.

SUMMARY OF THE INVENTION

In one embodiment the present invention is a method for predicting connectivity of seismic objects determined from seismic data collected from a subterranean region, where the method comprises the steps of (a) dividing the subterranean region into cells and determining from the seismic data the value of a preselected seismic attribute in each cell; (b) choosing a threshold criterion for the value of the seismic attribute; (c) determining for each cell whether the value of the selected attribute for that cell satisfies the chosen criterion; (d) identifying seismic objects containing only connected cells that satisfy the attribute criterion, using a pre-selected definition of connectivity; (e) repeating steps (b)–(d) for at least one different value of the attribute threshold; and (f) tracking each seismic object identified for changes in its size, spatial position, and connection to other objects, all as a function of attribute threshold value.

In some embodiments of the invention, objects are discarded if they are smaller in size than a pre-selected minimum size. In other embodiments, objects are discarded if they are larger than a preselected maximum size. In some preferred embodiments, the attribute and/or object size thresholds are varied beginning with the least restrictive values and progressing to the most restrictive values.

In some preferred embodiments of the invention, a 3-D visual display is used to present the results in step (d) above, thereby aiding the tracking of step (f). In some preferred embodiments, a 2-D hierarchical tree is used to graphically display the findings of step (f).

The results of step (f) may be used to predict connectivity of actual hydrocarbon-bearing formations.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications, and equivalents, which are included within the spirit and scope of the invention, as defined by the appended claims.

DETAILED DESCRIPTION OF THE INVENTION

Figure 1:
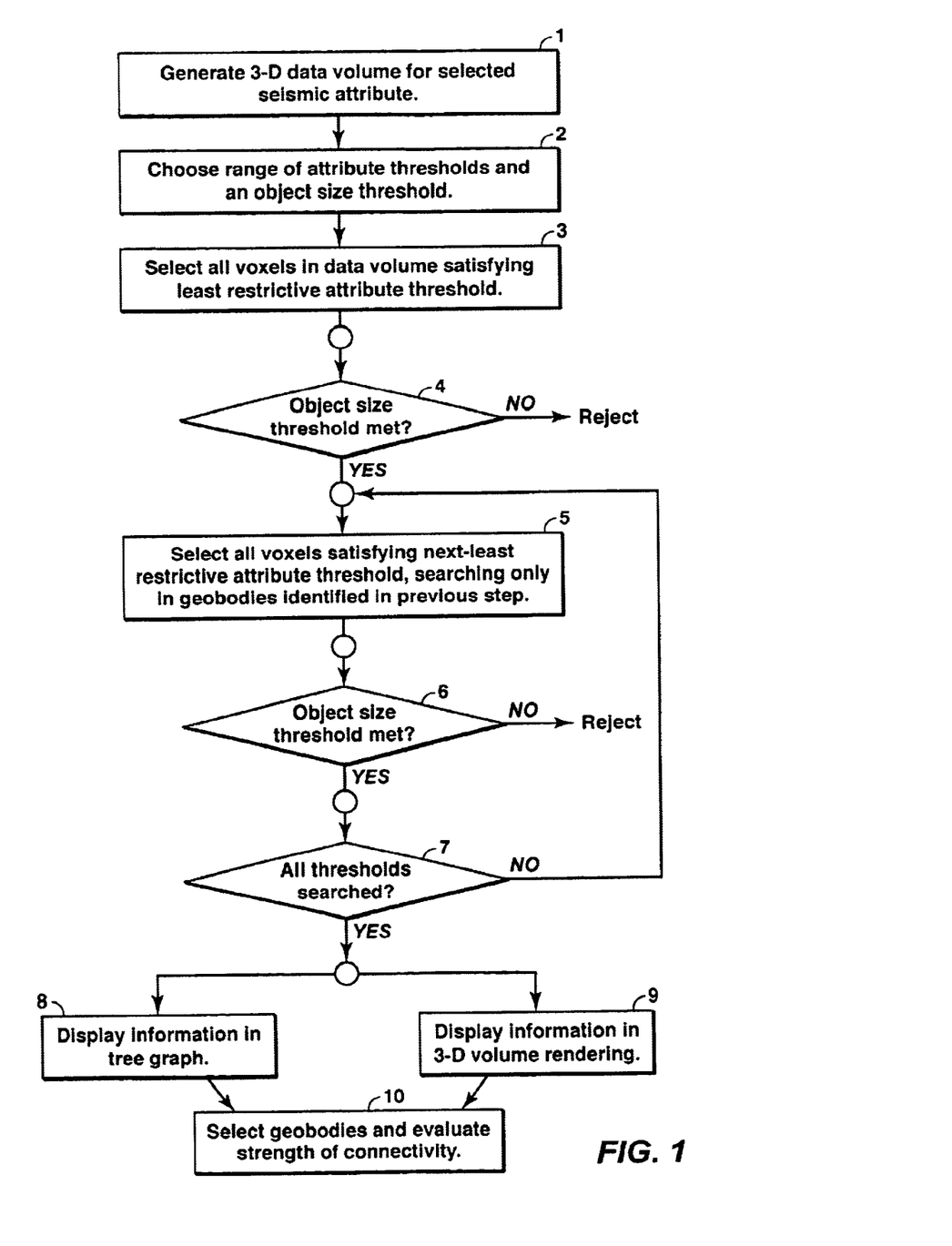
FIG. 1 is a flow chart of some embodiments of the present invention.

The present inventive method can be described as follows. FIG. 1 may be referred to for some preferred embodiments of the invention. At step 1, the user generates a 3-D data volume for some selected seismic attribute. For example, the attribute could be acoustic impedance, and the impedance values might be obtained by inverting seismic data. Or, the data volume might be values of the seismic amplitudes themselves, and the terms "seismic attribute" or "attribute" as used herein will be understood to be broad enough to encompass this. However, the selected attribute may be discontinuity or any other attribute besides amplitude or impedance. The term "data volume" merely means that the value of the attribute is known at all spatial locations within the chosen subterranean volume at discrete points on a 3-D grid. At step 2, the user selects one or more object size thresholds and several attribute threshold values spanning the range of interest. For example, the initial attribute threshold might be some minimum value of seismic amplitude, or some maximum value of acoustic impedance. Additional attribute threshold values are selected by progressively increasing the minimum value, where the threshold is a minimum value, perhaps by regular intervals. The object size threshold will usually be a minimum size, with objects smaller than that ignored and not displayed. In some instances, specifying a maximum object size in addition to or instead of the minimum value may be useful.

Connectivity criteria must also be defined. Voxels may be considered neighbors, i.e., connected, in various ways, as discussed previously. A specific connectivity, criterion must be used. In some preferred embodiments of the present invention, the software program will allow the user to choose among different connectivity criterion options. (This selection can be considered part of Step 2.)

At Step 3, every point (or voxel) in the data volume is checked, and those satisfying the initial attribute and object size thresholds are identified, preferably in an automated manner using a software algorithm. In preferred embodiments of the present invention, the initial thresholds will be the least restrictive of the choices from step 2. The voxels thus identified comprise seismic objects or geobodies.

In some preferred embodiments, step 3 is accomplished by an object-detection algorithm which starts by examining voxels until it finds one that meets the specified attribute criterion. This voxel is marked as belonging to an object or geobody. Then a region-growing algorithm is applied to this voxel. Such algorithm looks at neighboring voxels and identifies those that meet the attribute criterion. The neighbors are either face neighbors or edge/corner/face neighbors, depending upon which criterion the user specifies. Such neighbors that satisfy the attribute threshold are included in the geobody, and region growing is applied to them, and so on in this manner until region growing has been applied to all voxels in the present geobody and there are no more neighbors that meet the attribute threshold. At this point, the object size threshold is checked. If the object does not meet this size threshold, it is rejected.

Now the algorithm looks for an unconnected voxel that satisfies the attribute threshold. If it finds one, the cycle of finding neighbors and applying region growing is repeated, looking only at voxels not in the first object or examined during the growing of the first object. When a second object is identified, the size criterion is checked again. The algorithm stops only when all voxels in the 3-D volume have been examined and either included in an object or rejected. (Step 3 is now completed.)

Any object identification method that checks every voxel in the 3-D volume may be used. Preferred methods are those that check each voxel only once for given values of the input thresholds.

At step 4, the attribute size threshold is varied to the next least restrictive value. The preceding object identification process is repeated, but in preferred embodiments of the present invention, the only voxels that will be examined are those voxels that are part of an object at the previous attribute threshold. Thus, starting the process with the least restrictive threshold, and progressing to successively more restrictive values, the size of the objects will decrease, and there is no need to examine voxels that were not part of an object at the previous threshold.

As the process proceeds until all thresholds have been reached (step 5), the location of each voxel belonging to an object at each attribute threshold is stored externally. This information is a database from which the "history" of each object from one threshold to the next can be captured and visually displayed (Steps 6 and 7), which is a key feature of the present inventive method in its preferred embodiments. The operator is able to observe from such displays whether an object disappears at a more restrictive threshold, or whether it splits into one or more smaller objects, or whether it remains a single object of the same or smaller size. This information enables the operator to make informed judgements on whether seismic objects are connected with each other, with some sense of how strong that connectivity may be.

The "tree graph" of step 6 is a preferred way to capture the connectivity history in a useful visual display. The tree graph is explained and illustrated further in the examples provided below.

The entire process described above can be repeated for different object size thresholds, or even for a different connectivity criterion, to further enhance the confidence of the user in his interpretation of geobody connectivity.

Figure 2A:
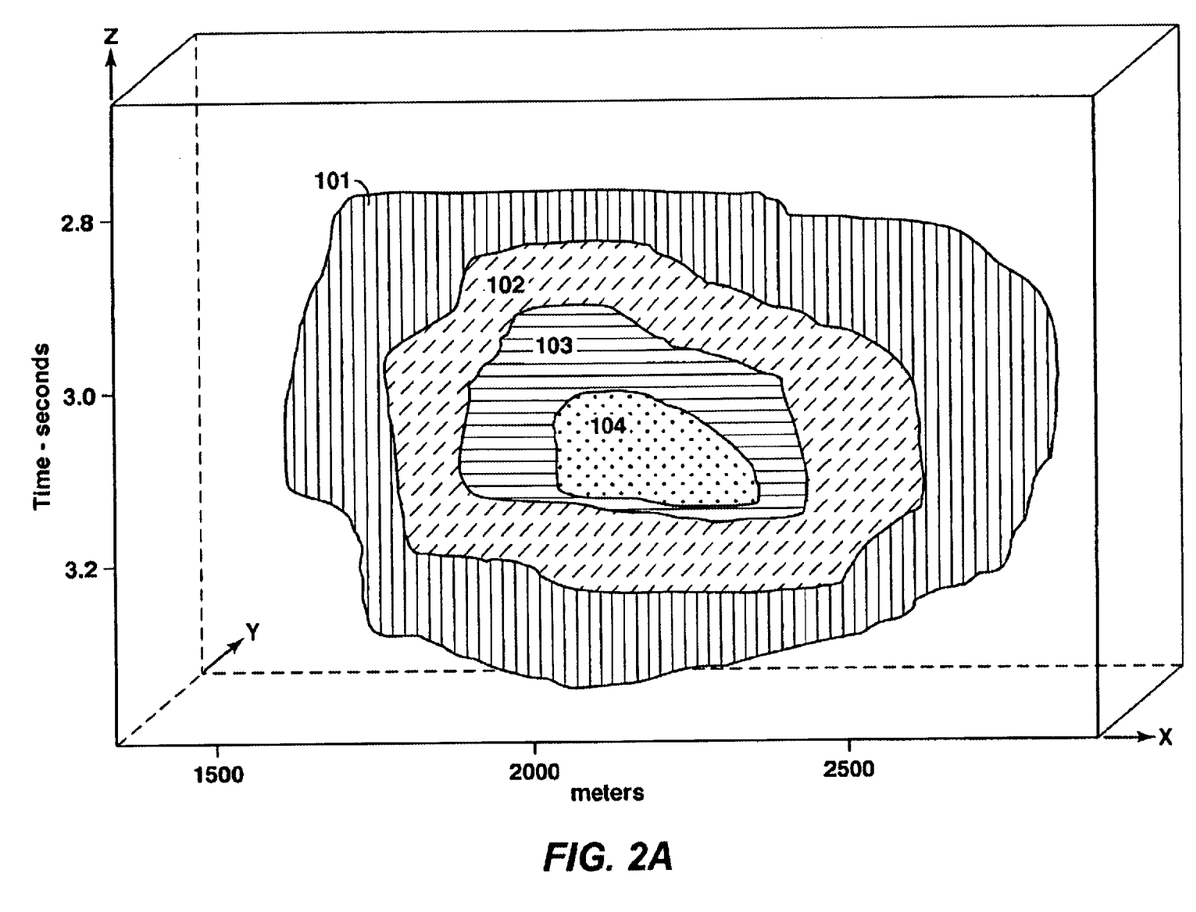
FIGS. 2A-B to 6A-B depict examples of 3-D visualization (A) and tree graph (B) displays obtainable with the present invention.
Figure 2B:
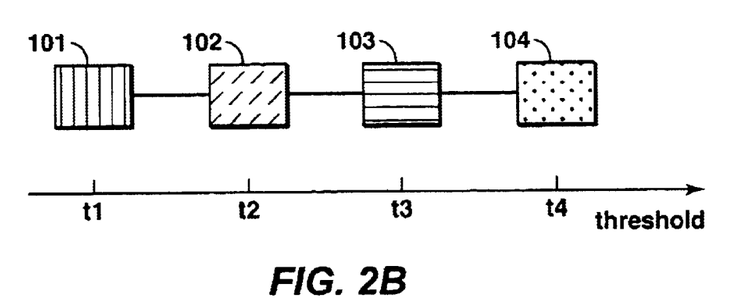

Examples of how the present inventive method works are illustrated in the accompanying drawings. FIG. 2A shows a highly connected seismic object, which changes minimally for tighter thresholds. It gets progressively smaller. At the least restrictive threshold t1, the object is at its largest (101). When the threshold is tightened to t2, the object 12 is reduced in size, but still a single object (102), and similarly for successively tighter thresholds t3 and t4 and smaller objects (103) and (104). FIG. 2B is the tree graph that corresponds to FIG. 2A. In preferred embodiments of the present invention, a 3-D visualization application would display both the 3-D volume rendering and the corresponding 2-D tree graph. Although not shown in the tree graphs depicted herein, the boxes of a tree graph may contain information about the geobody at the corresponding threshold. A box may include a number assigned to the geobody for identification purposes; the size of the geobody in voxels or other units; the threshold at which the geobody was detected (in FIG. 2B, that threshold would be t1); the (x, y, z) location of the geobody relative to some reference coordinate system; and any other useful information such as the length and width of the geobody. The thresholds t1, t2 . . . represent, for generality, both the attribute and object size thresholds. In practice, the operator generating FIGS. 2A and 2B might want to hold the object size threshold constant, while tightening only the attribute threshold from t1 to t4. Alternatively, the operator might elect to tighten one or both thresholds at each step. Whatever the object size thresholds in FIGS. 2A and 2B, they are inoperative because the object never disappears in this example. In the simple case illustrated in FIGS. 2A and 2B, the tree graph adds little to what the operator can readily glean from the 3-D volume rendering, but this will not be true for more complex examples such as the example depicted in FIGS. 3A and 3B.

Figure 3A:
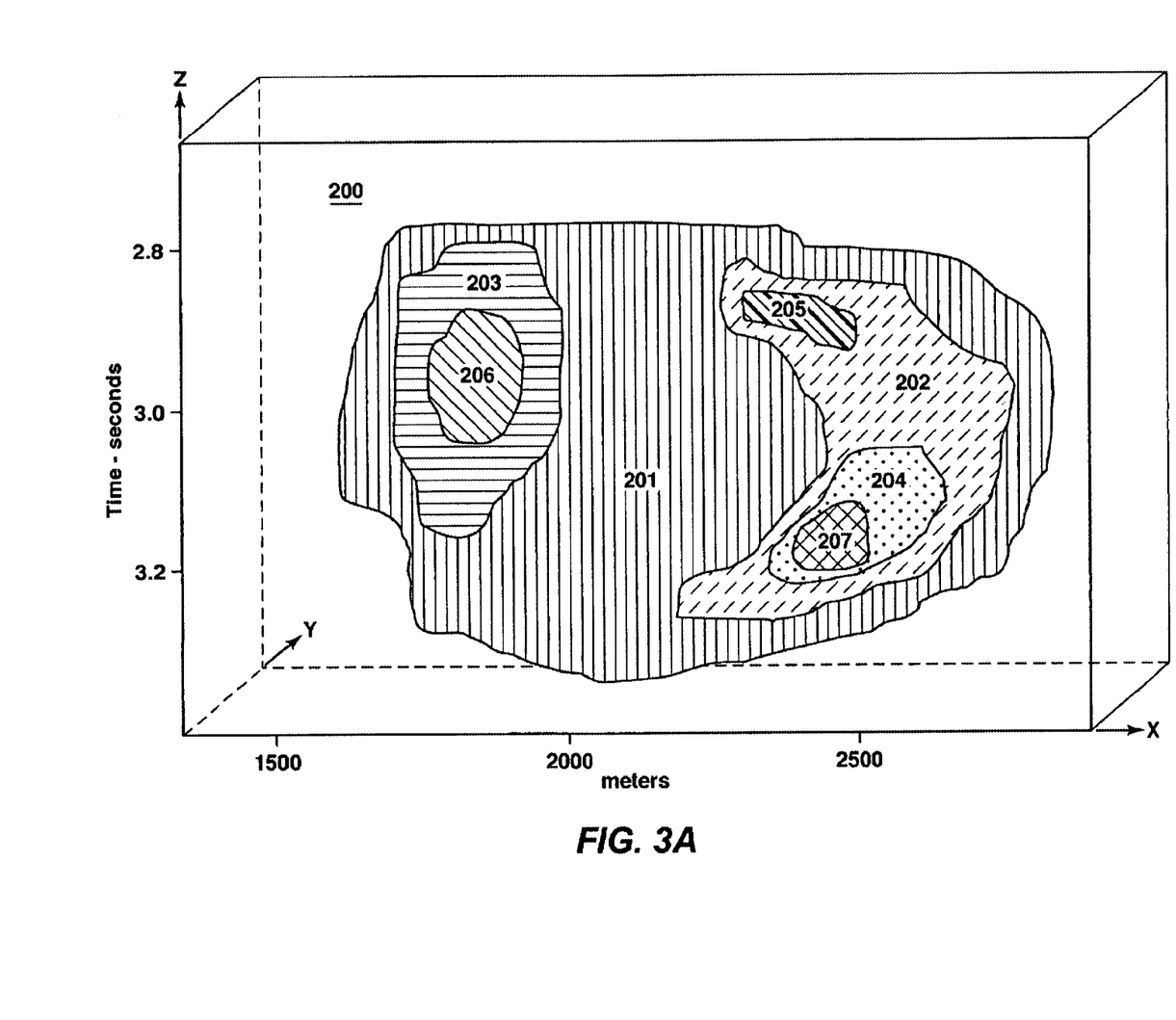
Figure 3B:
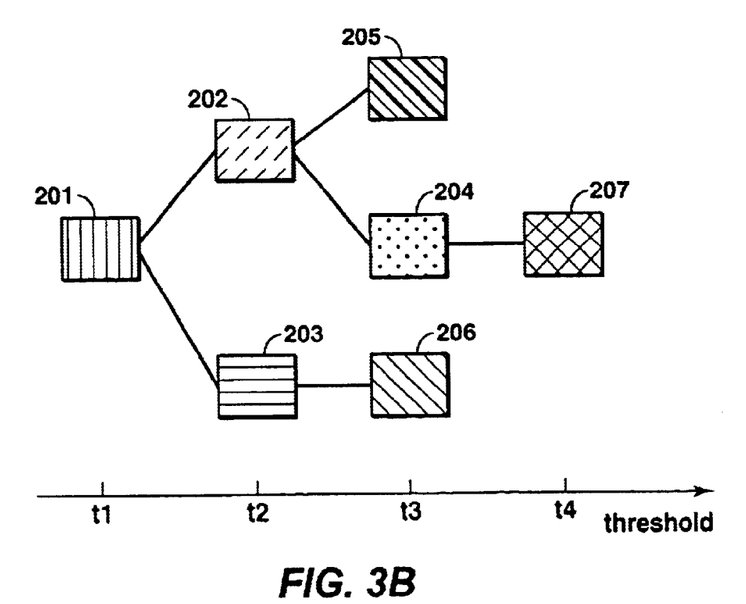

FIG. 3A depicts a geobody 201 that at threshold t1 looks exactly the same as the geobody 101 of FIG. 2A; however, it is not the same geobody as can be seen at threshold t2 where it splits into two objects 202 and 203, showing weaker connectivity than the geobody of FIG. 2A. At threshold t3, object 202 undergoes a further split into objects 204 and 205, while object 203 stays connected, reducing to a smaller size 206. At the most restrictive threshold, t4, all objects disappear except for 204, now reduced to a smaller size 207. The connectivity tree of FIG. 3B is clearly different and more complex than that of FIG. 2B.

Figure 4A:
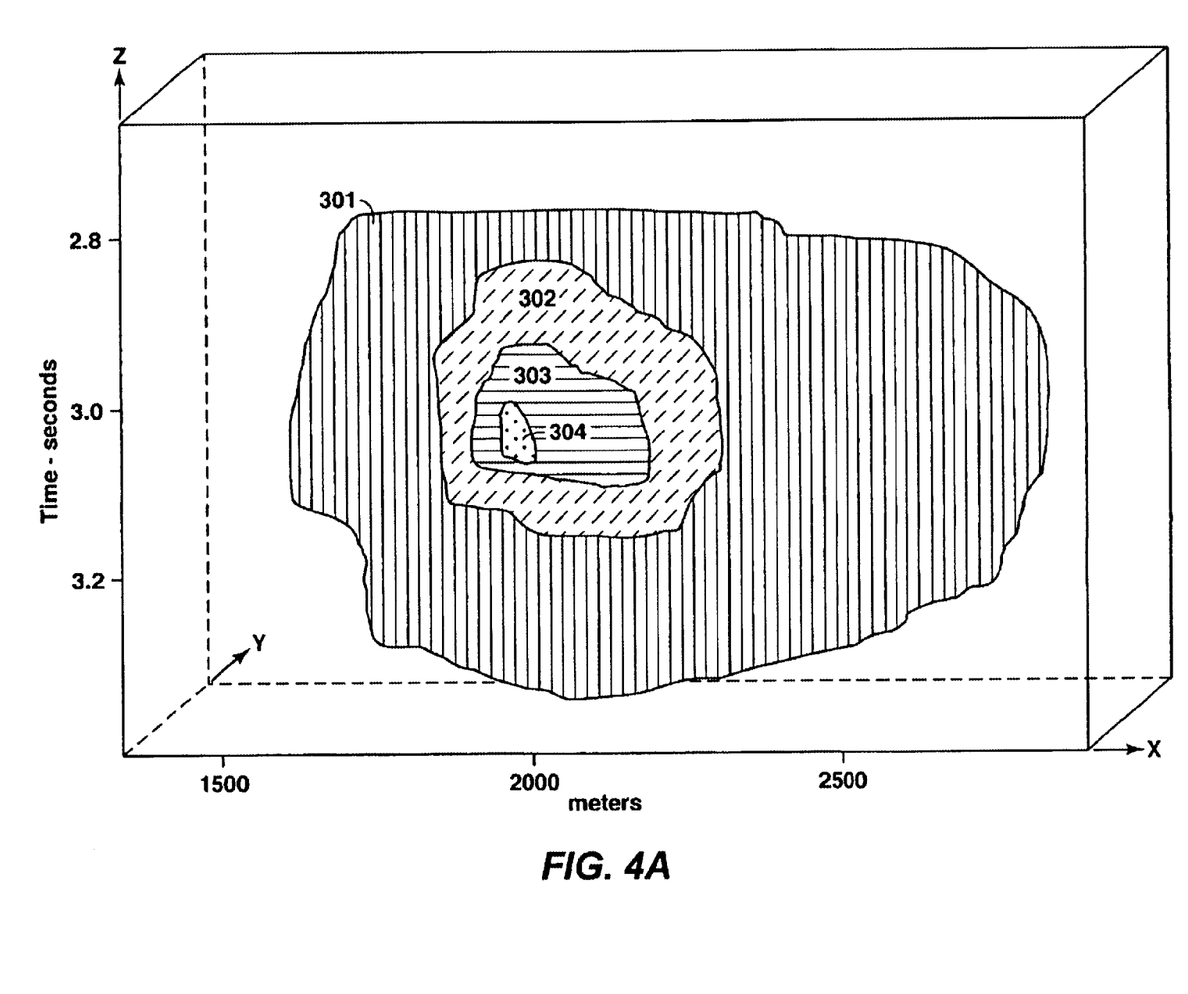
Figure 4B:
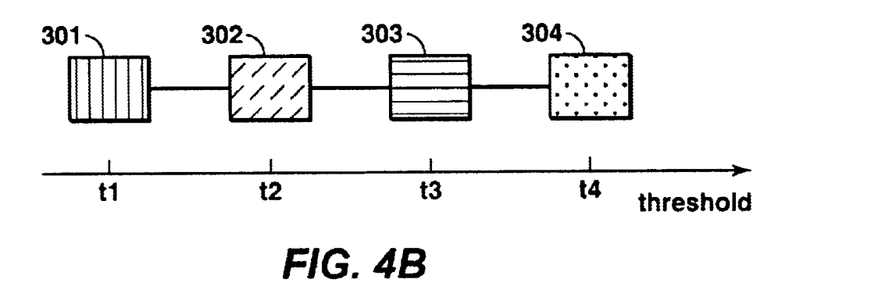

The object of FIG. 4A also looks the same as the object of FIG. 2A at threshold t1, i.e., 301 and 101 look the same. The tree graph (FIG. 4B) also looks the same as FIG. 2B, but the object size shrinks much more severely (from 302 to 303 and finally to 304) with tighter thresholds than in FIG. 2B, which size information may be displayed (not shown in the figure) in the boxes of the tree diagram.

Figure 5A:
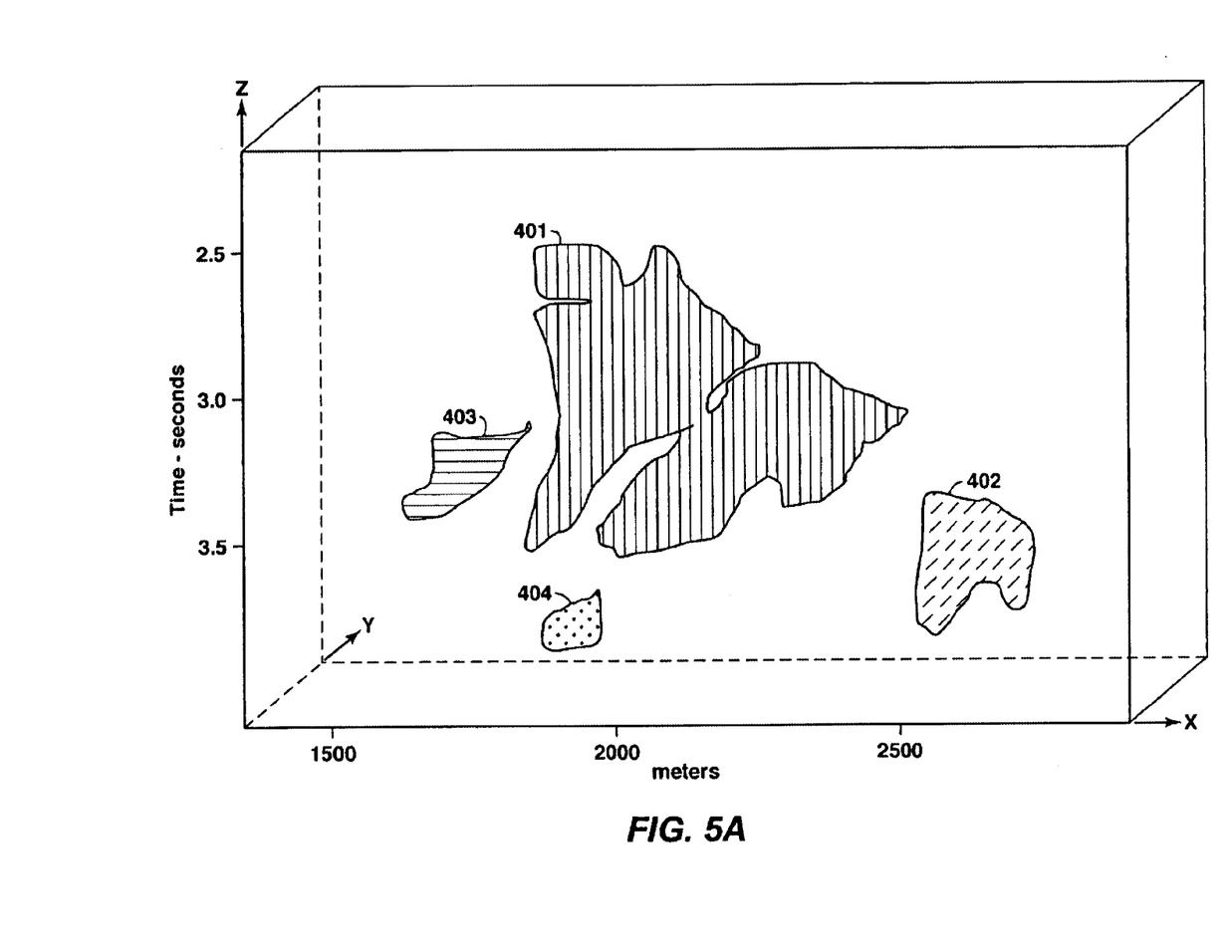
Figure 5B:
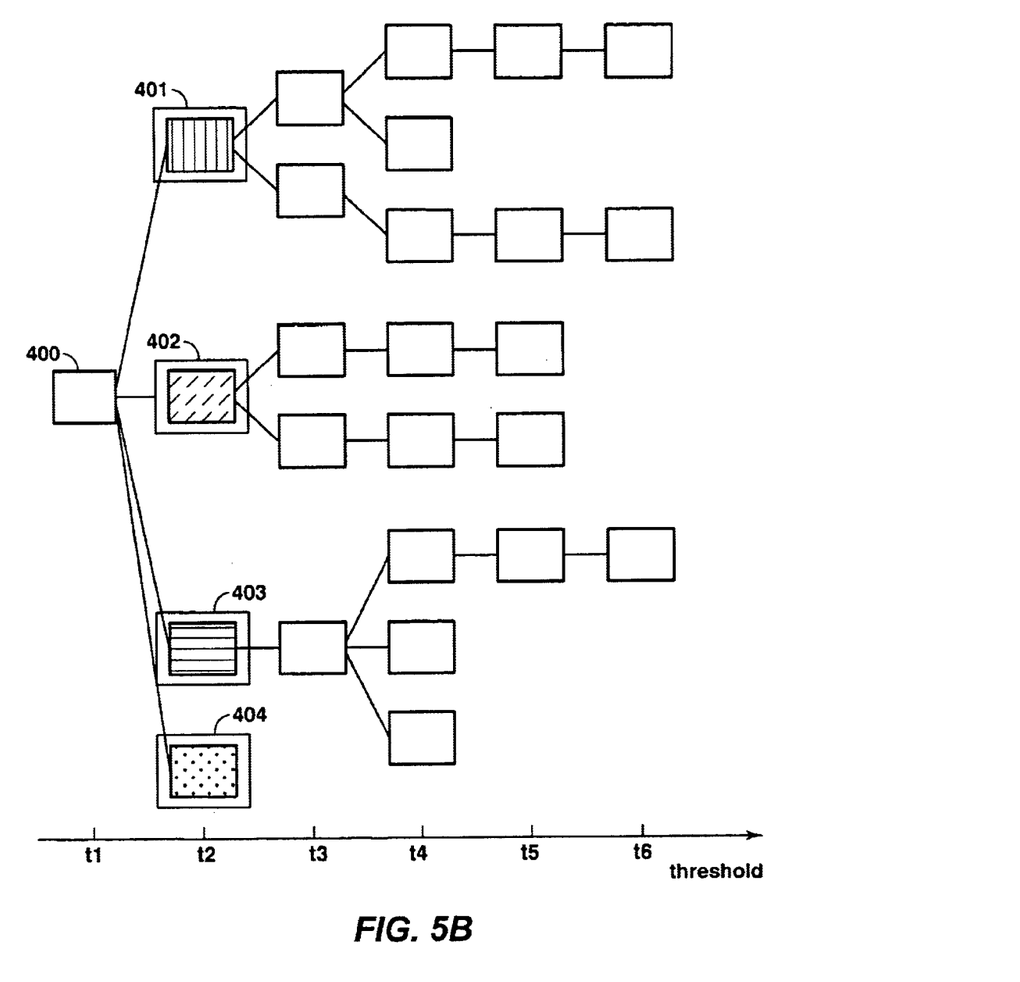

FIGS. 5A and 5B illustrate more complicated connectivity. Because of the complexity, the volume rendering (FIG. 5A) shows the objects only at a single threshold t2. (Note threshold t2 "highlighted" in FIG. 5B.) However, the corresponding tree graph (FIG. 5B) is easily able to show what happens at six different thresholds. At the least restrictive threshold t1, there is but a single object, 400, i.e., all voxels satisfying the threshold criteria are connected except possibly for objects not satisfying the object size criterion. At the next more restrictive threshold, t2, which is the threshold for FIG. 5A, the single object has split into four objects, 401, 402, 403 and 404. The tree graph (FIG. 5B) shows that at the next tighter threshold, t3, object 401 splits into two objects, as does object 402, object 403 remains a single object, but object 404 disappears due either to a more restrictive attribute threshold or a more restrictive minimum object size or a combination of both. Further object splittings or disappearances can readily be seen at thresholds t4, t5, and t6. The algorithm can be written to show the size and location of the object in each box of the tree graph. Thus, the 3-D volume rendering (FIG. 5A) is made almost superfluous by the tree graph. In the case of FIGS. 5A-B, the operator might predict three unconnected geologic features of interest as a gross overview.

Figure 6A:
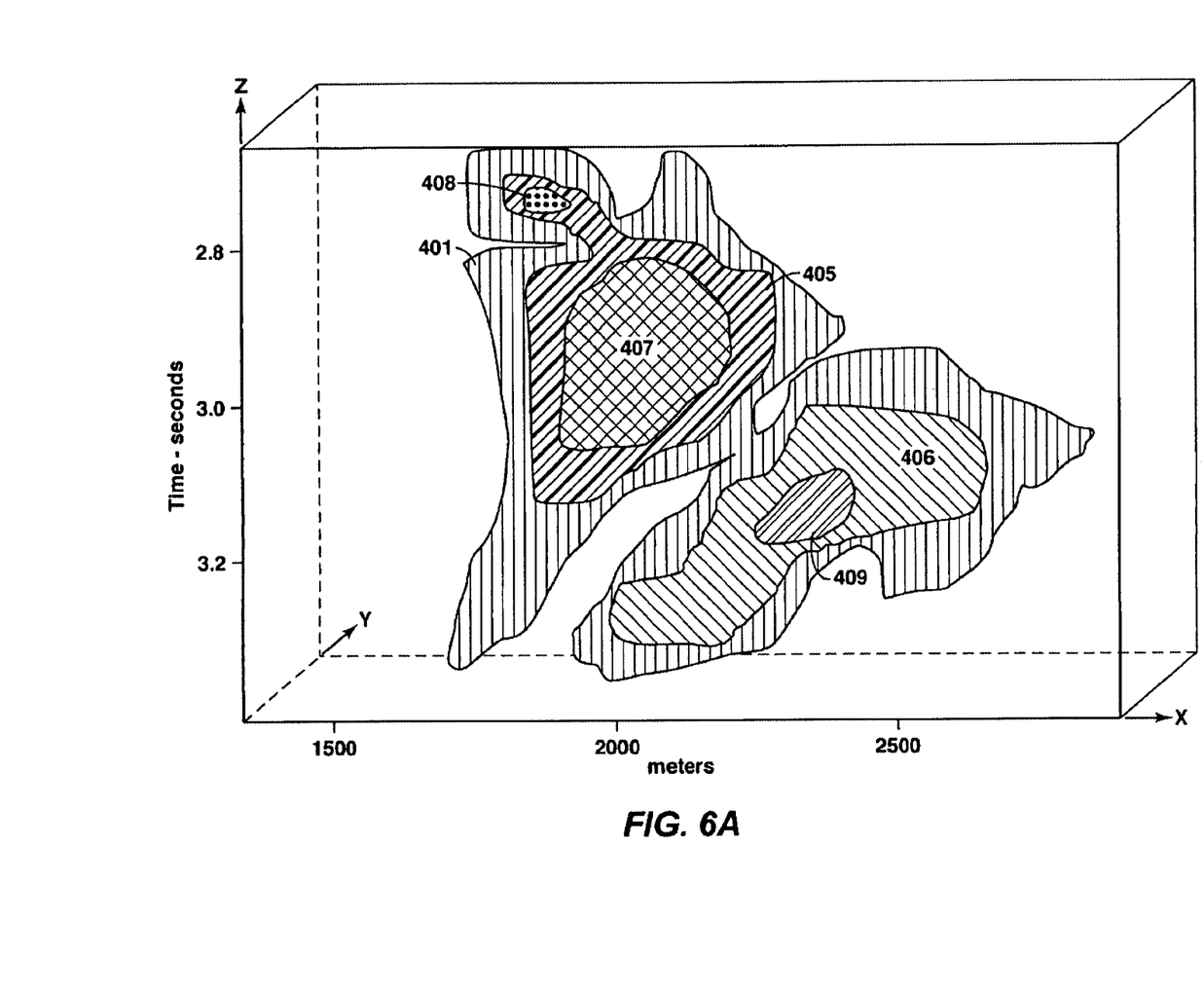

FIG. 6A uses the same data set as FIGS. 5A-B, examined at the same thresholds as FIG. 5B, but focusing on what happens to object 401 at tighter thresholds. The splitting of connected object 401 into unconnected objects 405 and 406 at tighter threshold t2, is shown, as is the further splitting of object 405 at threshold t3 into objects 407 and 408. Object 406 remains one body, but is smaller in size (409) due to a tighter attribute threshold. The corresponding tree graph, FIG. 6B, is identical to FIG. 5B except for the highlighting choices.

Figure 6B:
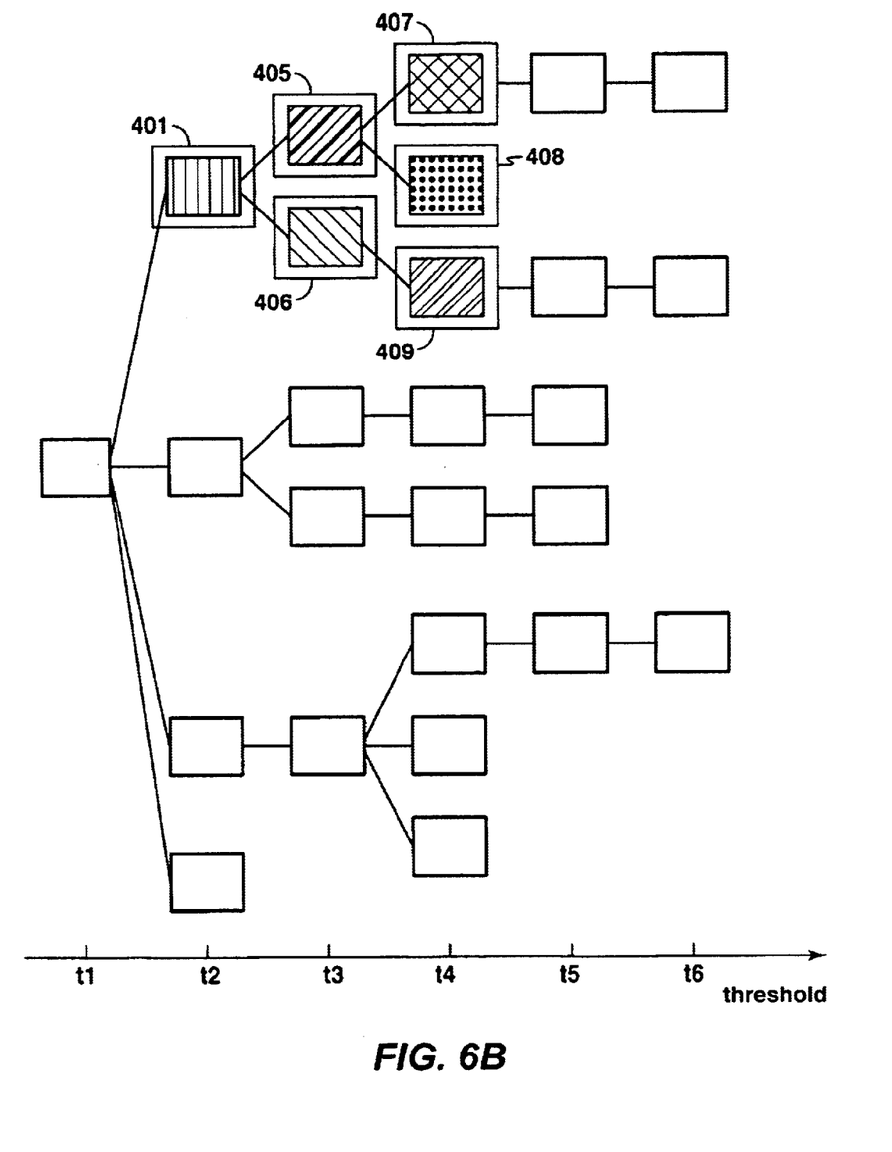

In both FIGS. 5B and 6B, some of the boxes are double boxes, which are used to denote that the operator has selected (normally a click of the mouse) these particular boxes in the tree graph. The algorithm may be constructed to produce a 3-D volume rendering display showing only what corresponds to the highlighted parts of the tree graph. Thus, as in FIG. 6A, a portion of the total volume can be shown in larger scale in a 3-D volume rendering.

The vertical (z) dimension in the volume rendering figures is given in terms of seconds of travel time, which is the directly measured quantity.

Figure 7:
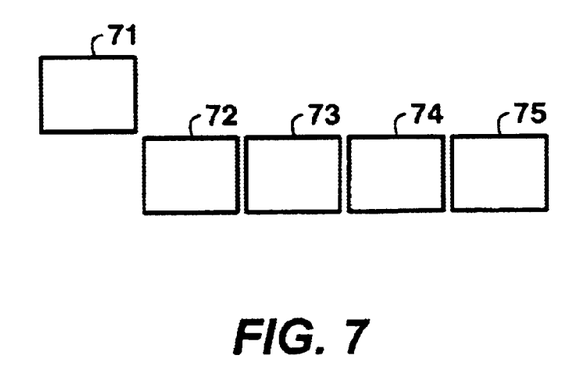
FIG. 7 illustrates the interplay between the present invention's criteria and thresholds.

FIG. 7 provides a simplified example of the interplay between the various criteria of the present invention. Assume that the only voxels in the data volume that satisfy the attribute threshold are the five voxels 71–75, all in the same plane for conceptual simplicity. If the connectivity criterion is the 26-way (edge/corner/face) criterion, then the visual displays of the present invention will show a single object comprised of the five voxels 71–75 if the size threshold is a minimum size of 5 or fewer. If the size threshold is a minimum of 6 or greater, no objects will be displayed.

If the 6-way (face) criterion is used, and the object size threshold is 2–4, one object will be displayed comprising the four voxels 72–75. For size threshold $\geq 5$, no objects will be displayed. For size threshold –1, two objects are displayed: the single voxel 71 and the four voxels 72–75.

The foregoing description is directed to particular embodiments of the present invention for the purpose of illustrating it. One skilled in the art will nevertheless be able to realize that many modifications and variations to the embodiments described herein are possible. All such modifications and variations are intended to be within the scope of the present invention as defined in the appended claims.

We claim:

1. A method for predicting connectivity of seismic objects determined from seismic data collected from a subterranean region, said method comprising the steps of:

a) dividing said subterranean region into cells and determining from said seismic data the value of a preselected seismic attribute in each cell;

b) choosing a threshold criterion for the value of said seismic attribute;

c) determining for each cell in said subterranean region whether the value of said seismic attribute satisfies said threshold criterion;

d) identifying seismic objects containing only connected cells that satisfy the attribute criterion, using a pre-selected definition of connectivity;

e) repeating steps b–d for at least one different value of said attribute value threshold; and f) tracking each identified seismic object for changes in its size, spatial position, and connections to other seismic objects, all as a function of attribute threshold value.

2. The method of claim 1, wherein the results from step f are used to predict connectivity of geologic features in said subterranean region.

3. The method of claim 1, wherein all seismic objects defined in step d smaller than a pre-selected minimum size are discarded from consideration.

4. The method of claim 1, wherein all seismic objects defined in step d larger than a pre-selected maximum size are discarded from consideration.

5. The method of claim 1, wherein a 3-D visual display is used to present the results in step d, thereby aiding said tracking in step f.

6. The method of claim 1, wherein a 2-D hierarchical tree display is used to graphically depict the results of step f.

* * * * *